Aug. 13, 1963  M. A. PRICE  3,100,507
COMBINED VENT AND DRAIN ASSEMBLY
Filed July 23, 1962

INVENTOR.
MARTIN A. PRICE
BY
George F. Waterman
ATTORNEY

3,100,507
COMBINED VENT AND DRAIN ASSEMBLY
Martin A. Price, Redondo Beach, Calif., assignor to the United States of America as represented by the Secretary of the Army
Filed July 23, 1962, Ser. No. 211,923
4 Claims. (Cl. 137—588)

The present invention relates to the field of vents and drains, more particularly to the field of vents and drains for fuel tanks.

In many tanks in which gasoline or other volatile liquids are stored, provision is made for draining the tank by gravity flow and for venting the vapor which accumulates over the liquid. Generally, separate means are used to drain the tank and to vent the tank. If the draining means and venting means are designed however so as to share common parts, greater economy and efficiency may be realized.

The object of this invention is to provide a combined vent and drain assembly for fuel tanks of an improved design.

Briefly the improved vent and drain assembly in its preferred form comprises a vertically disposed vent pipe extending from a point near the bottom of the fuel tank to a point in the tank's filler pipe above the maximum fuel level. A stopper valve and valve seat are positioned within the vent pipe near its lower end. The stopper valve is spring-biased downwardly against fluid pressure in the tank into sealing engagement with the valve seat. The stopper valve can be raised from the seat by a pull rod which extends upward through the vent pipe and passes through a conical vent pipe cap. There are holes beneath the vent pipe cap which permit vapor to flow from the fuel tank into the vent pipe at its top. The pull rod is connected at its upper end to the filler pipe cap. A flexible drain tube which leads out of the fuel tank near its bottom communicates with the vent pipe at a point between the lower and upper limiting positions of the stopper valve. When one wants to drain the tank, the filler pipe cap is pulled upward lifting the valve body off its seat thus permitting fuel to flow from the bottom of the tank into the vent pipe and out the drain tube. When the valve is in its normal closed position, held there by spring pressure, fumes in the tank may vent through the top of the vent pipe to the drain tube.

Figure 1:
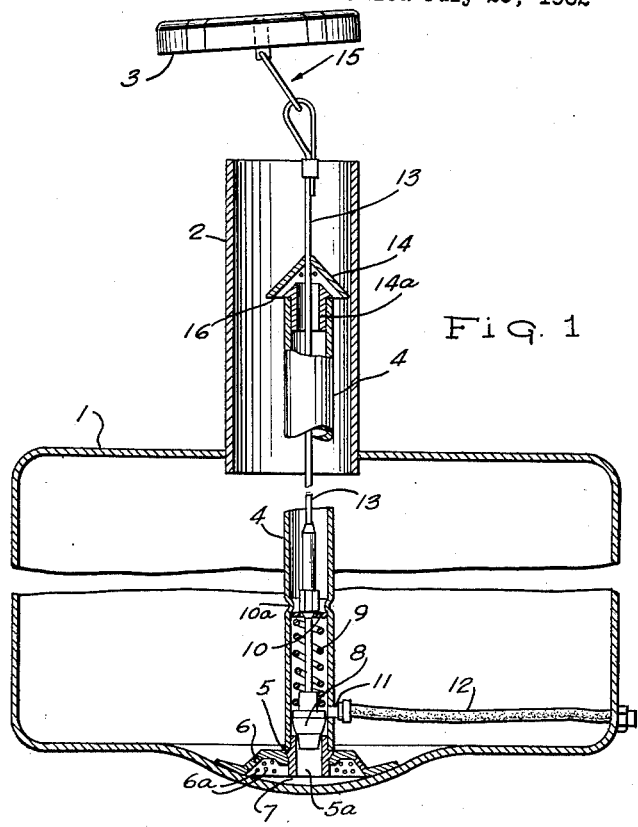
Figure 2:
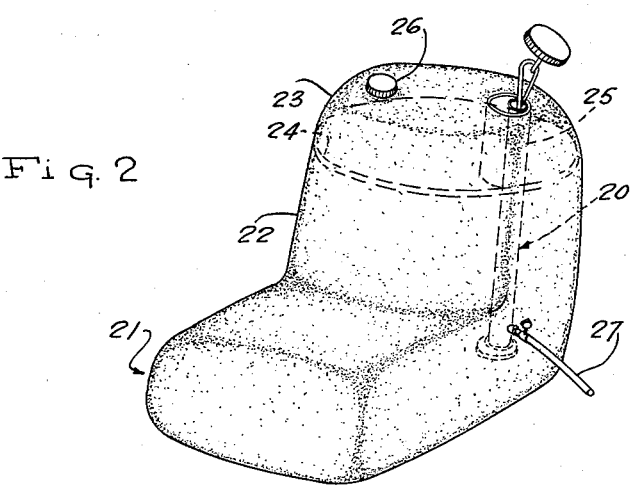

The specific nature of the invention as well as other objects and advantages will appear from the following description and the drawings in which:

FIG. 1 is a partial vertical sectional view of the combined vent and drain assembly in its preferred form; and FIG. 2 is an auxiliary fuel tank for an aircraft with a combined vent and drain assembly installed therein.

Referring to FIG. 1, the fuel tank 1 has a filler pipe 2 which is closed by filler pipe cap 3. Normally the fuel tank is not filled to a point beyond the bottom of filler pipe 2. A substantially vertical vent pipe 4 extends from a point near the bottom of tank 1 to a point within filler pipe 2. Valve seat 5 is screwed into the bottom of vent pipe 4 and is seated in the center of saucer-shaped strainer 6. The strainer is fastened at its perimeter to the bottom of fuel tank 1 and positions the bottom end of valve seat 5 within a curved depression or well 7 in the bottom of the tank. The strainer is made with a plurality of holes 6a which provide channels for fuel in the tank to port 5a in the valve seat. Stopper valve 8 disposed within vent pipe 4 is held against valve seat 5 in a normally closed position by compression spring 9. The other end of the spring acts against washer 10 and shoulder 10a formed in the wall of vent pipe 4. Nipple 11 extends from vent pipe 4 at a point immediately above stopper valve 8 when the valve is in its closed position. Flexible drain tube 12 is attached to the nipple; it passes through a wall of the tank and leads therefrom to a place where fuel and vapor may be discharged. Pull rod 13 which functions as a valve stem extends upwardly from stopper valve 8 through vent pipe 4 and through a close fitting aperture in vent pipe cap 14 to flexible connection 15 by which it is attached to filler pipe cap 3.

Vent pipe cap 14 has a conical top and an annular sleeve portion 14a which fits into vent pipe 4 and holds the vent pipe cap in place. Vent openings 16 are drilled from the underside of the vent pipe cap into its bore. When the fuel tank is being filled the incoming fuel splashes past the vent pipe cap and is prevented by that cap from entering the vent pipe.

When stopper valve 8 is in its normal closed position, the combined vent and drain assembly operates as a vent. Vapor forming above the fuel passes through vent openings 16 down through vent pipe 4 thence through nipple 11 to drain tube 12. When it is desired to drain the tank, filler pipe cap 3 is removed from filler pipe 2 and the filler pipe cap is lifted to a point where stopper valve 8 is raised above the opening of nipple 11. Fuel is then able to drain through strainer holes 6a into well 7 from thence through port 5a and nipple 11 to drain tube 12.

FIG. 2 shows the combined vent and drain assembly 20 installed in a special auxiliary fuel tank for a light aircraft or helicopter. The tank 21 is so shaped that it may be conveniently received in one of the extra seats of the aircraft. The tank is divided into two compartments 22 and 23 separated by partition 24. Compartment 22 which is drained and vented by the combined vent and drain assembly 20 is filled through its separate filler pipe 25 while compartment 23 may be filled through filler opening 26. In a divided fuel tank such as this the small upper compartment might be used as an auxiliary oil reservoir while the large lower compartment as an auxiliary fuel tank. Fuel and oil pumps and other necessary appurtenances are not shown. Drain tube 27 opens to the atmosphere outside the aircraft.

From the previously given description of the combined vent and drain assembly, it will be appreciated that the assembly constitutes a simple and efficient draining and venting means for the special auxiliary fuel tank of FIG. 2.

It will be understood that the vent and drain assembly described above may be modified in many respects and used in tanks other than fuel tanks without departing from the spirit of the invention. For example, the vent pipe need not be placed in the filler pipe and, if not in the filler pipe, it need have no vent pipe cap. A piston-like valve might be used in lieu of the stopper valve and valve seat. The pull rod may consist of a flexible cable and the drain tube may be rigid.

I claim:

1. A combined vent and drain assembly comprising a liquid holding tank, a substantially vertical vent pipe, open at both ends, extending from a point within said tank near the bottom of said tank to a point within said tank above the maximum level to which the tank is normally filled; a drain tube communicating with said vent pipe near the bottom thereof; a valve received in said vent pipe for longitudinal movement therein between a first normal position below the juncture of said vent pipe and said drain tube and a second position above that juncture; operating means for selectively moving said valve to said first and second positions.

2. A combined vent and drain assembly as described in claim 1 wherein said operating means comprises a pulling means disposed in said vent pipe and attached to said valve for moving said valve from its first to its second position and resilient means coacting between said valve and said vent pipe for returning said valve from its second to its first position when said pulling means is released.

3. A combined vent and drain assembly as described in claim 1 wherein the upper end of said vent pipe extends into the filler pipe of said tank and having in combination therewith a vent pipe cap for shielding the vent pipe's upper opening from incoming liquid when said tank is being filled.

4. A combined vent and drain assembly comprising a liquid holding tank having a well at the bottom thereof and a filler pipe with a removable filler pipe cap at the top thereof; a substantially vertical vent pipe, extending from a point within said well to a point within said filler pipe above the maximum level to which the tank is normally filled and open at both ends for communication with the interior of said well and said filler pipe; a strainer encircling the bottom of said vent pipe and secured at its outer periphery to the bottom of said tank; an annular valve seat disposed within said vent pipe near the bottom thereof; a stopper valve; resilient means normally holding said stopper valve in a first position in sealing engagement with said valve seat; a vent pipe cap having a pull rod receiving aperture at the top thereof for shielding the vent pipe's upper opening from incoming liquid when said tank is being filled; a pull rod secured at one end to said stopper valve, extending slidably through said aperture in said vent pipe cap and flexibly connected to said filler pipe cap, said pull rod being manually operable against the force of said resilient means to raise said stopper valve to a second position; and a drain tube communicating with said vent pipe at a point intermediate the first and second positions of said stopper valve.

References Cited in the file of this patent
UNITED STATES PATENTS

| | | |
|---|---|---|
| 538,896 | Cavallaro | May 7, 1895 |
| 1,551,407 | Kincannon | Aug. 25, 1925 |
| 1,699,527 | Folmsbee | Jan. 22, 1929 |